United States Patent
Terwilliger et al.

(10) Patent No.: US 11,999,498 B2
(45) Date of Patent: Jun. 4, 2024

(54) VARIABLE CYCLE COMPENSATION IN A GAS TURBINE ENGINE

(71) Applicant: RTX Corporation, Farmington, CT (US)

(72) Inventors: Neil Terwilliger, Meriden, CT (US); Sorin Bengea, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/517,936

(22) Filed: Nov. 3, 2021

(65) Prior Publication Data

US 2022/0055763 A1    Feb. 24, 2022

Related U.S. Application Data

(63) Continuation of application No. 16/126,200, filed on Sep. 10, 2018, now Pat. No. 11,167,858.

(51) Int. Cl.
*B64D 31/00* (2006.01)
*B64D 41/00* (2006.01)
(Continued)

(52) U.S. Cl.
CPC ............ *B64D 31/00* (2013.01); *B64D 41/00* (2013.01); *F01D 15/10* (2013.01); *F01D 17/162* (2013.01);
(Continued)

(58) Field of Classification Search
CPC ......... B64D 31/00; B64D 41/00; F01D 15/10; F01D 17/16; F01D 17/162;
(Continued)

(56) References Cited

U.S. PATENT DOCUMENTS

| | | | |
|---|---|---|---|
| 2,070,590 A | * | 2/1937 | Goldsmith ............... H02P 7/34 338/89 |
| 6,882,889 B2 | | 4/2005 | Fuller et al. |
| 7,949,416 B2 | | 5/2011 | Fuller |
| 9,342,060 B2 | | 5/2016 | Fuller et al. |
| 2010/0251726 A1 | | 10/2010 | Jones et al. |

(Continued)

FOREIGN PATENT DOCUMENTS

EP    1947311 A2    7/2008

OTHER PUBLICATIONS

EP Application No. 19196054.1 Extended EP Search Report dated Feb. 5, 2020, 7 pages.

(Continued)

*Primary Examiner* — Loren C Edwards
(74) *Attorney, Agent, or Firm* — CANTOR COLBURN LLP (57) ABSTRACT

An aspect includes a method of variable cycle compensation in a gas turbine engine. An electric component can be adjusted to compensate for a power change induced by an actuation system by operating the electric component as an electric motor to compensate for an increase in power absorption or a decrease in power production of a turbomachinery of the gas turbine engine. The actuation system is configured to adjust a variable cycle of the turbomachinery by adjusting power absorption or power production, and the electric component can be configured to add or subtract torque to a shaft of the gas turbine engine. The electric component can be operated as an electric generator to compensate for an increase in power production or a decrease in power absorption of the turbomachinery.

10 Claims, 9 Drawing Sheets

(51) Int. Cl.
*F01D 15/10* (2006.01)
*F01D 17/16* (2006.01)

(52) U.S. Cl.
CPC .... *F05D 2220/323* (2013.01); *F05D 2220/76* (2013.01); *F05D 2260/57* (2013.01); *F05D 2260/70* (2013.01); *F05D 2260/81* (2013.01); *F05D 2270/20* (2013.01)

(58) Field of Classification Search
CPC ........... F05D 2220/323; F05D 2220/76; F05D 2260/57; F05D 2260/70; F05D 2260/81; F05D 2270/051; F05D 2270/20; F02C 9/20; F02C 9/50; F02C 9/58; F02C 7/042; F02C 7/057; F02C 7/36; F02K 1/16; F02K 1/165
See application file for complete search history.

(56) References Cited

U.S. PATENT DOCUMENTS

| | | |
|---|---|---|
| 2012/0221156 A1 | 8/2012 | Fuller et al. |
| 2013/0094963 A1 | 4/2013 | Rolt |
| 2016/0186600 A1 | 6/2016 | Surace |
| 2017/0058786 A1 | 3/2017 | Stockwell |
| 2018/0079516 A1 | 3/2018 | Phan et al. |
| 2018/0127104 A1 | 5/2018 | Kobayashi et al. |
| 2018/0178920 A1* | 6/2018 | Swann ..................... F02K 5/00 |
| 2020/0079517 A1 | 3/2020 | Terwilliger et al. |

OTHER PUBLICATIONS

European Office Action for European Application No. 19196054.1; dated Feb. 28, 2022; 6 pages.

* cited by examiner

VARIABLE CYCLE COMPENSATION IN A GAS TURBINE ENGINE

CROSS-REFERENCE TO RELATED APPLICATIONS

This application is a continuation of U.S. patent application Ser. No. 16/126,200 filed Sep. 10, 2018, the disclosure of which is incorporated by reference herein in its entirety.

BACKGROUND

The subject matter disclosed herein generally relates to engine systems and, more particularly, to a method and apparatus for variable cycle compensation in a gas turbine engine.

Variable geometry in a gas turbine engine can provide a faster thrust response as one or more components of the gas turbine engine are adjusted in position or orientation as compared to only modifying a fuel flow rate to accelerate or decelerate a rate of engine spool rotation within the gas turbine engine. Engine thrust response changes are typically slower to adjust relative to the rate at which variable geometry of the engine can change.

BRIEF DESCRIPTION

According to one embodiment, a method of variable cycle compensation in a gas turbine engine can include adjusting, by a controller, an electric component to compensate for a power change induced by an actuation system by operating the electric component as an electric motor to compensate for an increase in power absorption or a decrease in power production of a turbomachinery of the gas turbine engine. The turbomachinery includes at least one compressor section and at least one turbine section operably coupled to a shaft of the gas turbine engine. The actuation system is configured to adjust a variable cycle of the turbomachinery by adjusting power absorption or power production. The electric component can be configured to add or subtract torque to the shaft. The electric component can be operated as an electric generator to compensate for an increase in power production or a decrease in power absorption of the turbomachinery.

In addition to one or more of the features described above or below, or as an alternative, further embodiments may include receiving a control input and determining a plurality of current operating conditions of the gas turbine engine.

In addition to one or more of the features described above or below, or as an alternative, further embodiments may include calculating a plurality of commands to a plurality of power production and absorption subsystems for adjusting the variable cycle based on the current operation condition of the gas turbine engine using a plurality of models of the subsystems that describe relationships between the commands and respective impacts on engine power production and absorption.

In addition to one or more of the features described above or below, or as an alternative, further embodiments may include communicating the commands to the power production, power absorption, and one or more other actuation subsystems based on the control input and the current operating conditions.

In addition to one or more of the features described above or below, or as an alternative, further embodiments may include where the electric component is a motor-generator.

In addition to one or more of the features described above or below, or as an alternative, further embodiments may include where the electric component absorbs power as the electric generator to produce electrical power for an aircraft use or recharging of a battery system.

In addition to one or more of the features described above or below, or as an alternative, further embodiments may include where the actuation system includes a variable area turbine.

In addition to one or more of the features described above or below, or as an alternative, further embodiments may include where the electric component adds power as the electric motor.

In addition to one or more of the features described above or below, or as an alternative, further embodiments may include where the actuation system includes one or more of a variable area nozzle and/or a variable fan blade angle.

In addition to one or more of the features described above or below, or as an alternative, further embodiments may include where the actuation system includes an adaptive fan system and/or a rotating fan inlet guide vane.

According to another embodiment, a method includes adjusting, by a controller, a variable cycle of a turbomachinery of a gas turbine engine. A shaft power supply or a load corresponding respectively to an adjustment of the turbomachinery is provided for separate control of thrust and cycle responses and compensating for a power change induced by adjusting the variable cycle of the turbomachinery.

In addition to one or more of the features described above or below, or as an alternative, further embodiments may include where control operation of the controller is based on one or more of a thrust command and/or a throttle lever angle.

In addition to one or more of the features described above or below, or as an alternative, further embodiments may include where control operation of the controller is based on one or more of a clearance, a compressor parameter, and/or a turbine parameter.

In addition to one or more of the features described above or below, or as an alternative, further embodiments may include where the shaft power supply or the load is provided by a generator.

In addition to one or more of the features described above or below, or as an alternative, further embodiments may include where adjusting the variable cycle of the turbomachinery is performed by adjusting power absorption or power production of an actuation system.

In addition to one or more of the features described above or below, or as an alternative, further embodiments may include where the actuation system includes a variable area turbine.

In addition to one or more of the features described above or below, or as an alternative, further embodiments may include where the actuation system includes one or more of: a variable area nozzle, a variable fan blade angle, an adaptive fan system, and/or a rotating fan inlet guide vane.

In addition to one or more of the features described above or below, or as an alternative, further embodiments may include where the shaft power supply or the load is provided by an electric motor.

In addition to one or more of the features described above or below, or as an alternative, further embodiments may include where the shaft power supply or the load is provided by a motor-generator operable in a generator mode to charge a battery system and in a motor mode to provide supplemental rotation force to the gas turbine engine based on electric current from the battery system or an auxiliary power unit.

In addition to one or more of the features described above or below, or as an alternative, further embodiments may include using the battery system during flight to power one or more electrical systems.

A technical effect of the apparatus, systems and methods is achieved by providing variable cycle compensation in a gas turbine engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
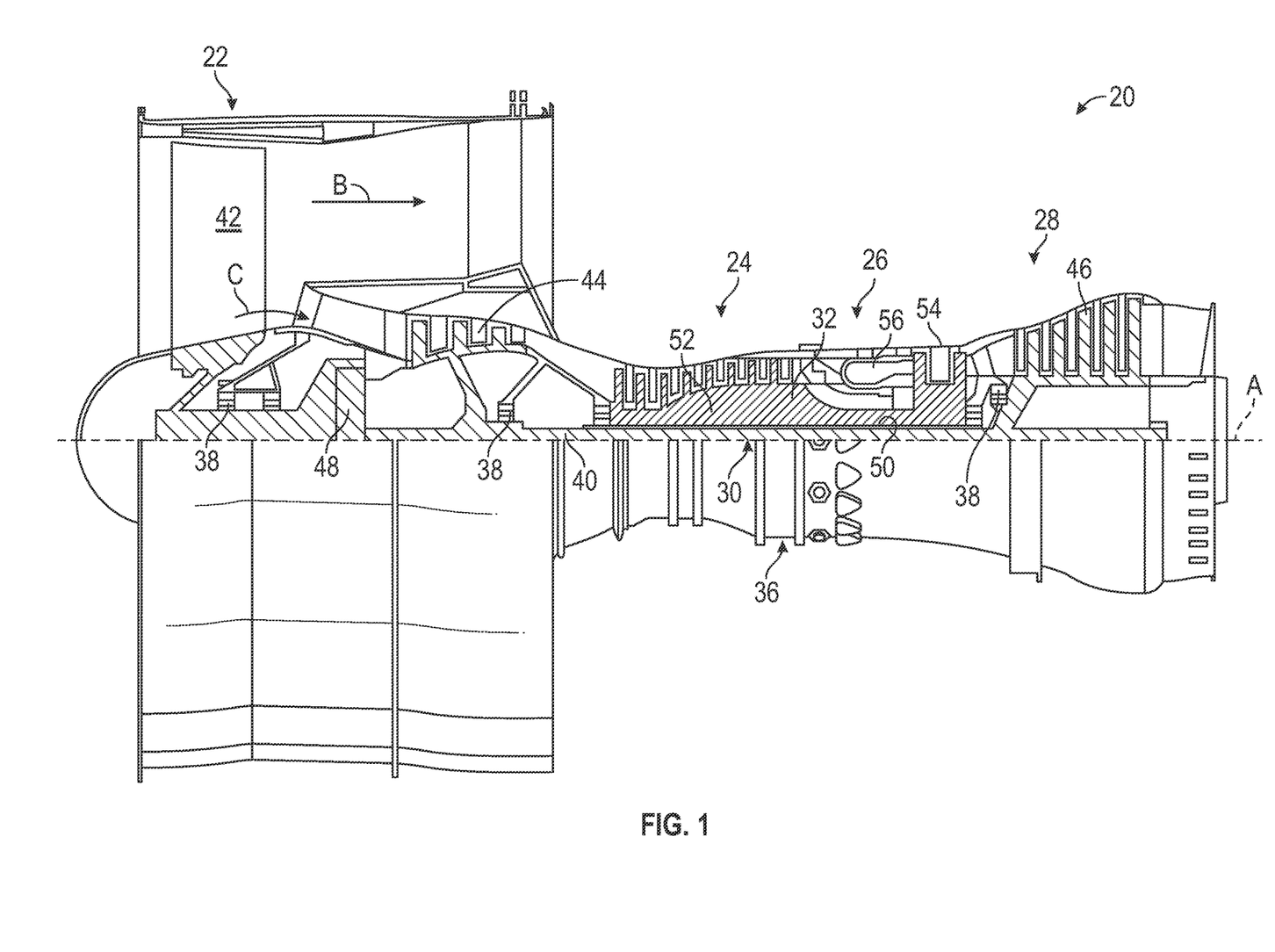
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ("TSFC")"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]^0.5. The "Low corrected fan tip speed" as disclosed herein according to one non-limiting embodiment is less than about 1150 ft/second (350.5 m/sec).

While the example of FIG. 1 illustrates one example of the gas turbine engine 20, it will be understood that any number of spools, inclusion or omission of the gear system 48, and/or other elements and subsystems are contemplated. Further, rotor systems described herein can be used in a variety of applications and need not be limited to gas turbine engines for aircraft applications. For example, rotor systems can be included in power generation systems, which may be ground-based as a fixed position or mobile system, and other such applications.

Figure 2:
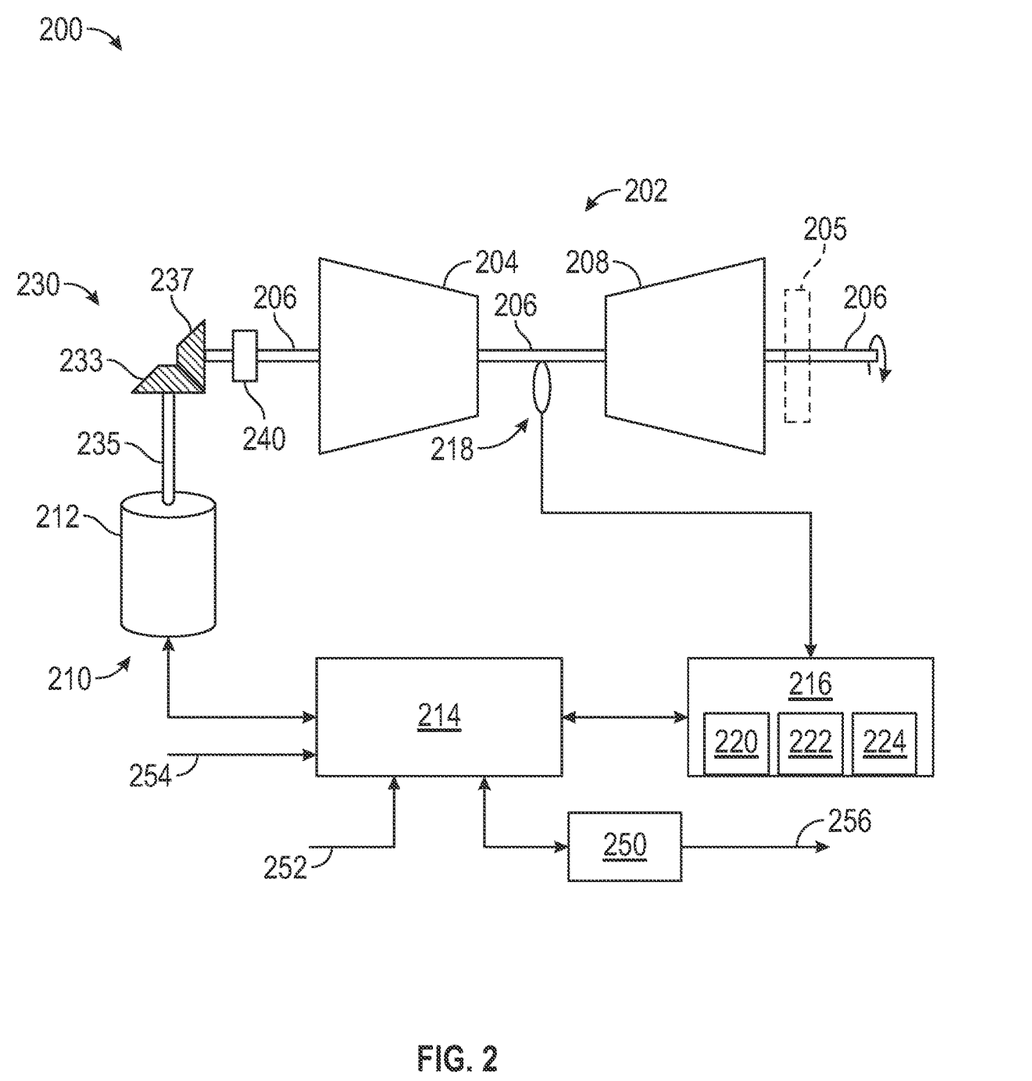
FIG. 2 is a schematic diagram of a variable cycle system, in accordance with an embodiment of the disclosure.

FIG. 2 illustrates turbomachinery 202 that includes at least one compressor section 204 and at least one turbine section 208 operably coupled to a shaft 206 as part of an aircraft 200. The turbomachinery 202 can be a spool of the gas turbine engine 20 of FIG. 1, such as the low speed spool 30 or the high speed spool 32. For example, when embodied as the low speed spool 30, the at least one compressor section 204 can be equivalent to the low pressure compressor 44, the shaft 206 can be equivalent to the inner shaft 40, and the at least one turbine section 208 can be equivalent to the low pressure turbine 46 of FIG. 1. When embodied as the high speed spool 32, the at least one compressor section 204 can be equivalent to the high pressure compressor 52, the shaft 206 can be equivalent to the outer shaft 50, and the at least one turbine section 208 can be equivalent to the high pressure turbine 54 of FIG. 1. The at least one compressor section 204 can include a fan, such as an adaptive fan system or a fan that supports a variable fan blade angle.

In the example of FIG. 2, a variable cycle system 210 is operably coupled to the turbomachinery 202. The variable cycle system 210 includes an electric component 212 operably coupled to the shaft 206. In the example of FIG. 2, a geared interface 230 operably couples the electric component 212 to the shaft 206. The geared interface 230 can include, for instance, an auxiliary gear 233 coupled to an auxiliary shaft 235 driven by the electric component 212. The geared interface 230 can also include a rotor gear 237 coupled to the shaft 206. The auxiliary gear 233 and the rotor gear 237 can each be beveled gears. The auxiliary shaft 235 can be a tower shaft that enables the electric component 212 to be separated at a greater distance from the turbomachinery 202 than direct coupling to the shaft 206 would provide. Further separation of the electric component 212 from the turbomachinery 202 can improve accessibility to the electric component 212 for servicing and may reduce heating effects of the turbomachinery 202 on the electric component 212 (e.g., due to fuel combustion). A disconnect 240, such as a clutch, can be positioned between the electric component 212 and a portion of the shaft 206 such that the electric component 212 can be selectively engaged and disengaged to rotate with rotation of the shaft 206. In alternate embodiments, the electric component 212 is operably coupled to the shaft 206 absent the geared interface 230 (e.g., direct coupling).

The variable cycle system 210 also includes converter electronics 214 operable to condition current to/from the electric component 212. In some embodiments, the electric component 212 is a motor-generator configurable in a generator mode to charge a battery system 250 and in a motor mode to provide supplemental rotation force to the turbomachinery 202 of gas turbine engine 20 of FIG. 1. The electric component 212 can include conventional generator/motor components, such as a rotor and stator, including a plurality of windings and/or permanent magnets. The converter electronics 214 can also include conventional current control electronics, such as filters, switching components, rectifiers, inverters, voltage converters, and the like. The electric component 212 can perform as a variable frequency generator in a generator mode due to speed fluctuations of rotation of the shaft 206, which may be primarily driven by the at least one turbine section 208. Alternatively, a frequency normalizing component can interface with the electric component 212 to produce a constant frequency output (e.g., through the converter electronics 214 or as a mechanical interface between the electric component 212 and the shaft 206). In some embodiments, the electric component 212 may be operable as a starter motor to partially or completely power rotation of the shaft 206 in a starting mode of operation (e.g., to start the gas turbine engine 20 of FIG. 1) and/or can provide supplemental power to the shaft 206 during various flight phases of the aircraft 200. Other uses and functions for the electric component 212 are contemplated.

The converter electronics 214 can control charging of the battery system 250 responsive to a controller 216. The controller 216 can enable a flow of a charging current from the electric component 212 or a power input 252 to charge the battery system 250 as regulated and conditioned through the converter electronics 214. The power input 252 can be an external input, such as power received through a plug interface while the aircraft 200 is on the ground at a ground-based power source, e.g., at a gate or service location. In some embodiments, the converter electronics 214 may receive electric current from an auxiliary power input 254 to provide a supplemental or alternative power source for charging the battery system 250. For instance, the auxiliary power input 254 may receive electric current from an auxiliary power unit (not depicted) or another instance of the gas turbine engine 20 on the aircraft 200. The charge stored in the battery system 250 can provide an electric current for a propulsion system use 256, which may include powering one or more electric motors of the aircraft 200 during various operational states and/or providing power to the electric component 212 when operating in a motor mode, for instance, to assist in driving rotation of shaft 206. The propulsion system use 256 can be part of the gas turbine engine 20 that includes the turbomachinery 202 or another aircraft system, such as another instance of the gas turbine engine 20 on the aircraft 200. The battery system 250 can be used on the ground or during flight to power one or more electrical systems.

In embodiments, the controller 216 of the variable cycle system 210 can monitor one or more rotor system sensors 218 while the turbomachinery 202 is rotating. The rotor system sensors 218 can be any type or combination of sensors operable to measure aspects of the motion of the turbomachinery 202. For example, the rotor system sensors 218 can include one or more accelerometers, speed sensors, torque sensors, and the like. The rotor system sensors 218 can be existing sensors used for controlling the gas turbine engine 20. The controller 216 can control a charging of the battery system 250, for instance, by selecting the source of electric current received through the converter electronics 214. The controller 216 can also control operation of the electric component 212. Data collected from the rotor system sensors 218 can be used to determine an operational status of a gas turbine engine 20 of FIG. 2. Alternatively, the operational status of a gas turbine engine 20 can be received as a signal or message from an alternate source, such as an engine system or aircraft communication bus. The controller 216 may also control other system aspects, such as controlling operation of the gas turbine engine 20 of FIG. 1. For example, the controller 216 can be integrally formed or otherwise in communication with a full authority digital engine control (FADEC) of the gas turbine engine 20. The rotor system sensors 218 need not be directly coupled to the controller 216, as sensor data or sensor-derived data can be observed or determined by another control (e.g., a FADEC) and provided to the controller 216. In embodiments, the controller 216 can include a processing system 220, a memory system 222, and an input/output interface 224. The processing system 220 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 222 can store data and instructions that are executed by the processing system 220. In embodiments, the memory system 222 may include random access memory (RAM), read only memory (ROM), or other electronic, optical, magnetic, or any other computer readable medium onto which is stored data and algorithms in a non-transitory form. The input/output interface 224 is configured to collect sensor data from the one or more rotor system sensors 218 and interface with the converter electronics 214 and/or other systems (not depicted).

The controller 216 may control an output of the electric component 212 to compensate a shaft power supply and/or loading of the turbomachinery 202 in coordination with an output of an actuation system 205. The actuation system 205 can be located in a gas path of the gas turbine engine 20 FIG. 1. Although only a single instance of the actuation system 205, there can be multiple instances of the actuation system 205 at various locations on the gas turbine engine 20 having different features that modify an engine geometry to impact thrust and/or other parameters of the gas turbine engine 20. The actuation system 205 can be a means of adjusting power absorption, such as one or more of: a variable area nozzle, a variable fan blade angle, an adaptive fan system, and a rotating fan inlet guide vane. To compensate power absorption, the electric component 212 can be implemented as an electric motor or operated in a motor mode. Alternatively, the actuation system 205 can be a means of adjusting power production, such as a variable area turbine. The actuation system 205 can include any system operable to effect a variable cycle in the gas turbine engine 20, and may include components not directly in the gas path, such as, an intercooled cooling air control system with an adjustable flow control. To compensate power production, the electric component 212 can be implemented as an electric generator or operated in a generator mode. Thus, the variable cycle feature of the actuation system 205 can be compensated by the electric component 212. As one feature adjusts the ability of the gas turbine engine 20 to absorb power, the other provides the required power without time needed for spool speeds to change.

As a further example, the electric component 212 may be generally referred to as a variable cycle system compensation means operable to compensate a power change induced by or in coordination with the actuation system 205, where the variable cycle system compensation means is operable to respond at a second rate that is faster than a first rate of change initiated by the actuation system 205. The actuation system 205 is a variable cycle component that may lag in responsiveness, for instance, due to spool inertia and/or other factors. Further, although only a single instance of the electric component 212 is depicted, there can be multiple instances of the electric component 212 incorporated in variable cycle system 210, such as one or more dedicated instances of an electric motor and an electric generator for one or more spools of the gas turbine engine 20.

FIGS. 3-6 illustrate a variable cycle compensation example for a variable fan paired with an electric motor with corresponding responses during a snap acceleration. For instance, a variable pitch fan can provide a rapid thrust response without compensation, but power may be drawn from spool inertia, which is counter-productive to increasing power production of the turbine to compensate the increased power absorption of the variable pitch fan. Spool speed can go down, which takes time for the gas turbine engine 20 to catch up. By pairing an electric motor as the electric component 212 with the variable pitch fan as the actuation system 205, the electric motor can compensate to increase the ability of the variable pitch fan to translate shaft power to thrust. This provides a more rapid thrust response without losing shaft speed. Thus, thrust response can be limited by actuator speed rather than spool speed.

Figure 3:
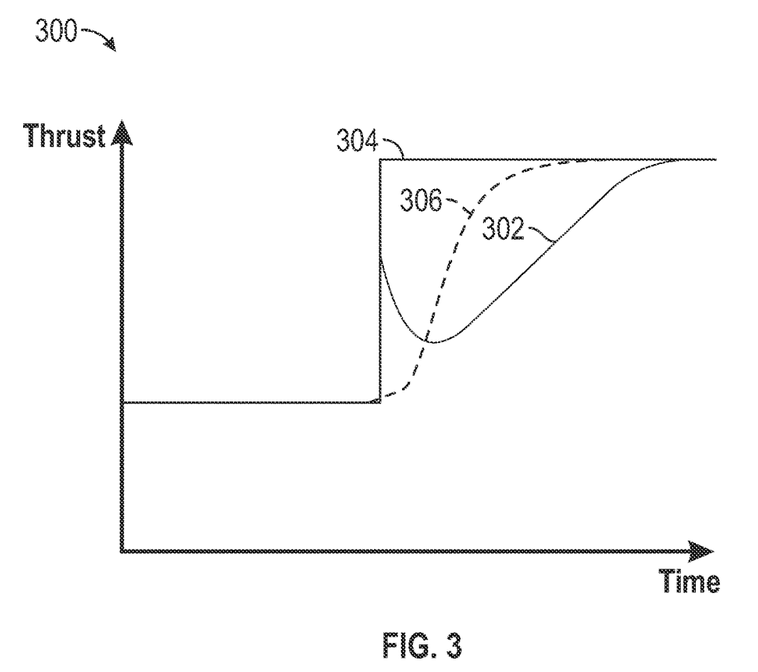
FIG. 3 is a thrust plot of a snap acceleration, in accordance with an embodiment of the disclosure.

FIG. 3 is a thrust plot 300 of a snap acceleration, in accordance with an embodiment. In thrust plot 300, a conventional engine with variable pitch fan response 302 is illustrated relative to an ideal response 304 and a conventional engine acceleration response 306.

Figure 4:
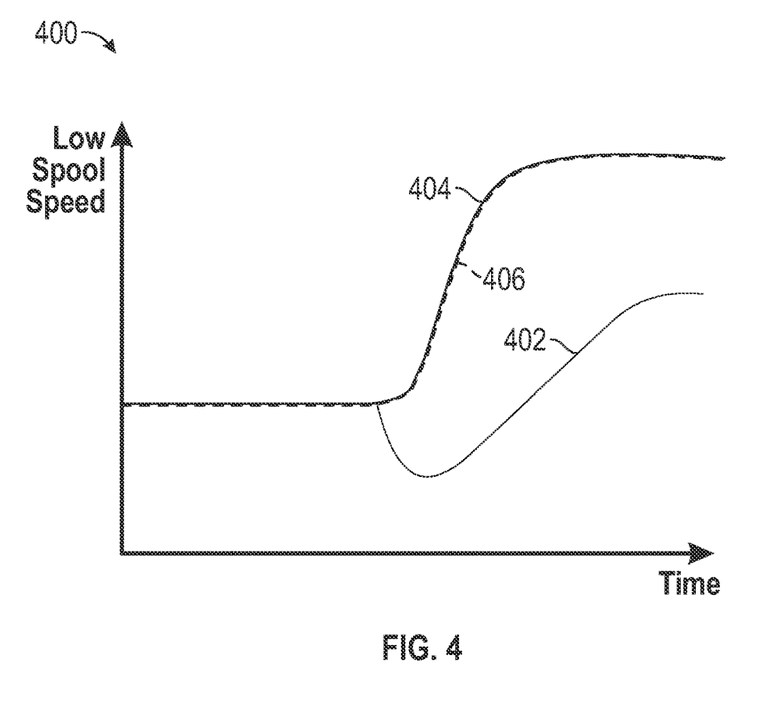
FIG. 4 is a speed plot of a snap acceleration, in accordance with an embodiment of the disclosure.

FIG. 4 is a low spool speed plot 400 of a snap acceleration, in accordance with an embodiment. In low spool speed plot 400, a conventional engine with variable pitch fan response 402 is illustrated relative to a variable pitch fan with electric motor response 404, and a conventional engine response 406.

Figure 5:
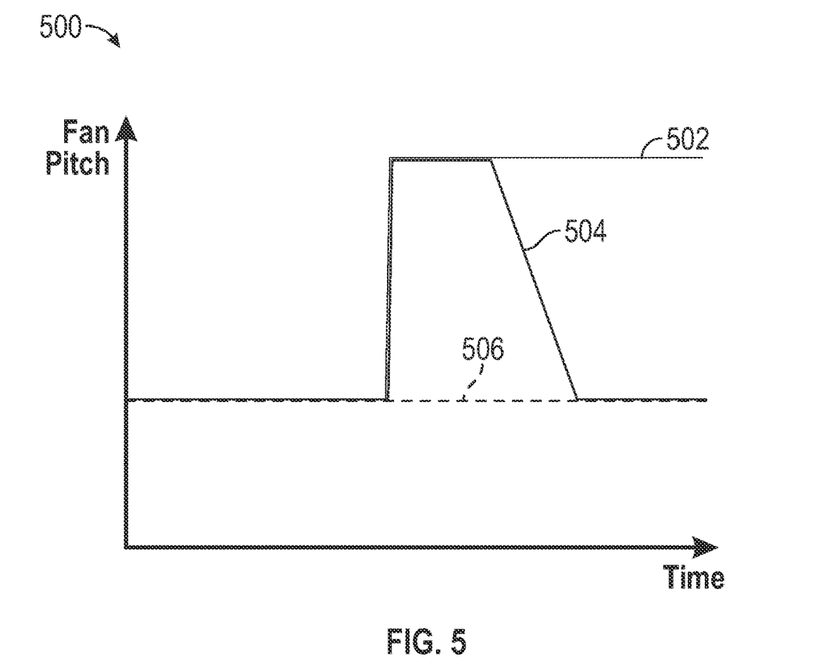
FIG. 5 is a fan pitch plot of a snap acceleration, in accordance with an embodiment of the disclosure.

FIG. 5 is a fan pitch plot 500 of a snap acceleration, in accordance with an embodiment. In fan pitch plot 500, a conventional engine with variable pitch fan response 502 is illustrated relative to a variable pitch fan with electric motor response 504 and a conventional engine response 506 that does not support a variable fan pitch.

Figure 6:
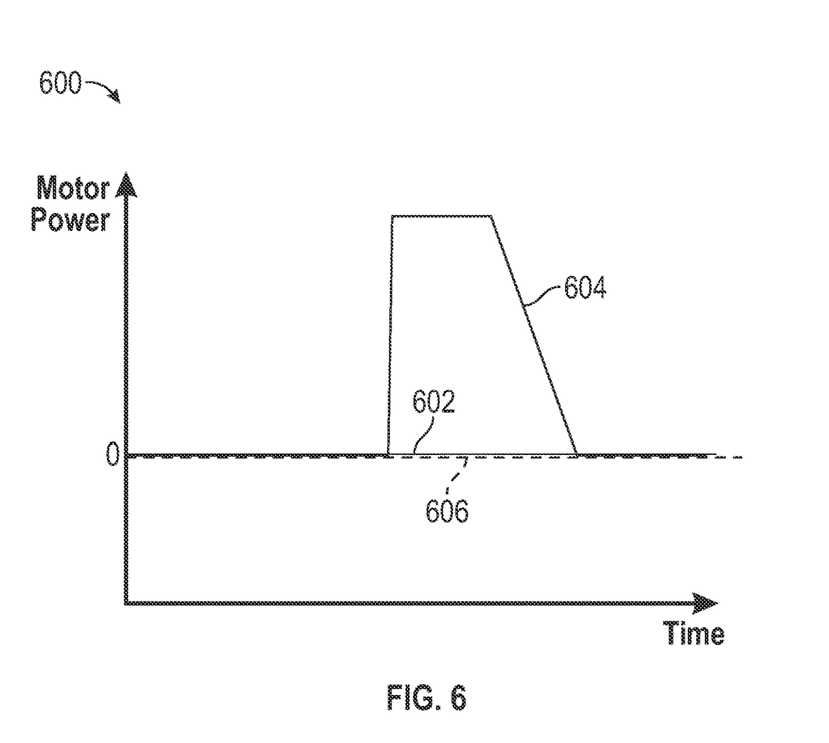
FIG. 6 is a motor power plot of a snap acceleration, in accordance with an embodiment of the disclosure.

FIG. 6 is a motor power plot 600 of a snap acceleration, in accordance with an embodiment. In motor power plot 600, a conventional engine with variable pitch fan response 602 is illustrated relative to a variable pitch fan with electric motor response 604 and a conventional engine response 606 that does not support a variable fan pitch. Collectively, the motor power depicted in the variable pitch fan with electric motor response 604 combines with the fan pitch in the variable pitch fan with electric motor response 504 of FIG. 5 to enhance snap acceleration performance as illustrated, for example, in FIGS. 3-6.

FIGS. 7-10 illustrate a variable cycle compensation example for a variable fan paired with an electric motor with corresponding responses during an auto-throttle or other high frequency oscillation event. A conventional engine with variable pitch fan can see a rapid thrust response but dependence upon spool speed limits the ability to replicate a commanded high frequency thrust response. A pairing of an electric motor as the electric component 212 with the variable pitch fan as the actuation system 205 can more accurately reproduce a commanded thrust profile without affecting the cycle match. The electric motor can be a motor-generator and absorb excess power into energy storage and reduce total energy use when the stored energy is harvested.

Figure 7:
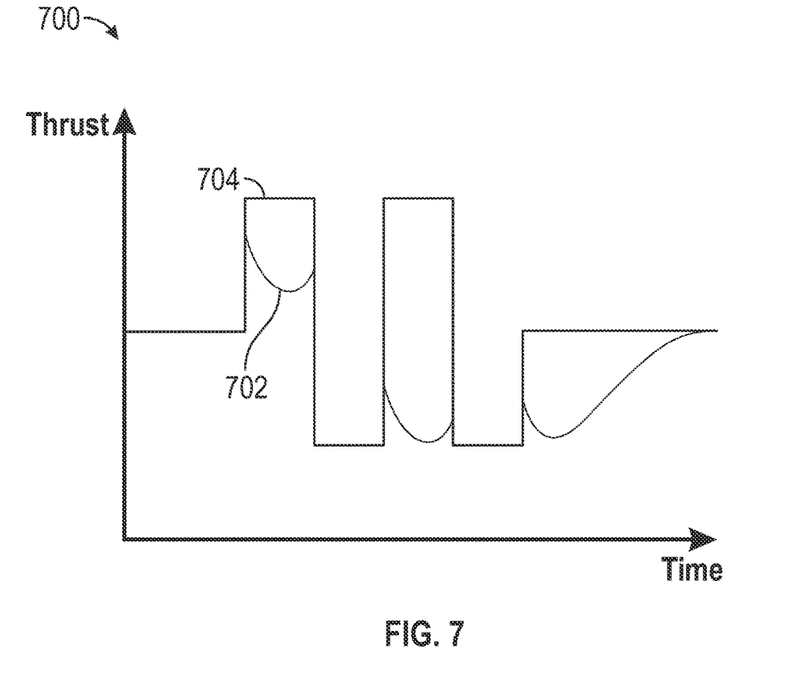
FIG. 7 is a thrust plot of a high frequency oscillation, in accordance with an embodiment of the disclosure.

FIG. 7 is a thrust plot 700 of an auto-throttle, in accordance with an embodiment. In thrust plot 700, a conventional engine with variable pitch fan response 702 is illustrated relative to a variable pitch fan with electric motor response 704. Notably, due to inertia effects, for example, not only does the conventional engine with variable pitch fan response 702 fail to track the oscillation magnitude, but the delayed responsiveness can result in a cumulative effect with each cycle of oscillation. For instance, since the first peak value is not reached in the conventional engine with variable pitch fan response 702, a subsequent cycle starts at a lower level which reduces the amplitude response for the conventional engine with variable pitch fan response 702.

Figure 8:
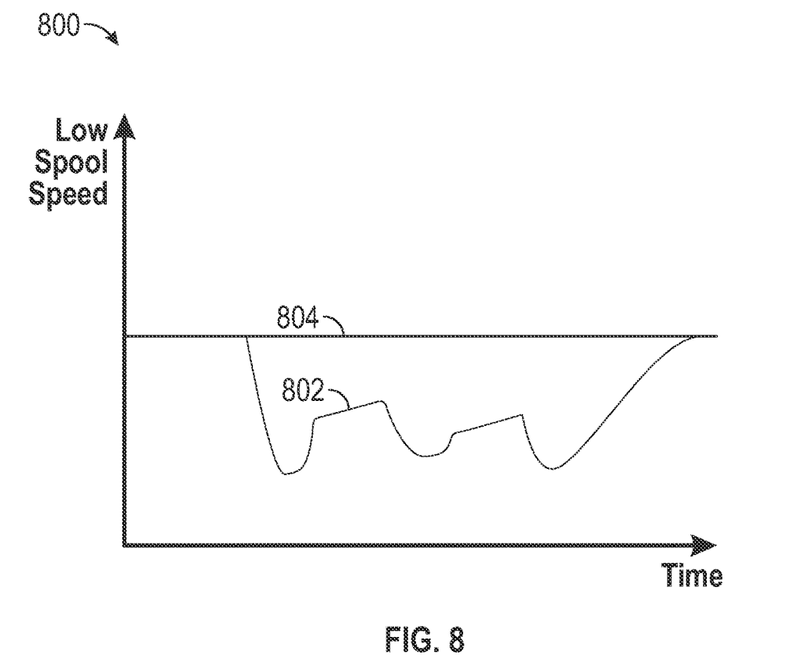
FIG. 8 is a speed plot of a high frequency oscillation, in accordance with an embodiment of the disclosure.

FIG. 8 is a low spool speed plot 800 of an auto-throttle, in accordance with an embodiment. In low spool speed plot 800, a conventional engine with variable pitch fan response 802 is illustrated relative to a variable pitch fan with electric motor response 804. As can be seen in comparison to FIG. 7, the imbalanced thrust response of the conventional engine with variable pitch fan response 702 can result in an imbalance in the conventional engine with variable pitch fan response 802, with the speed not held substantially constant. In contrast, the more rapid responsiveness of the variable pitch fan with electric motor response 704 can enable the variable pitch fan with electric motor response 804 to remain substantially constant during the thrust oscillations of FIG. 7.

Figure 9:
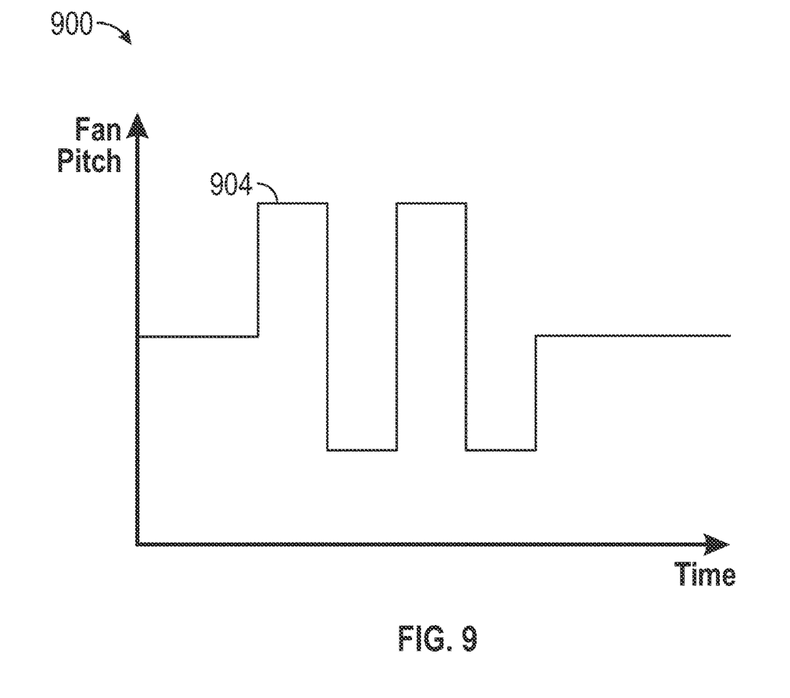
FIG. 9 is a fan pitch plot of a high frequency oscillation, in accordance with an embodiment of the disclosure.
Figure 10:
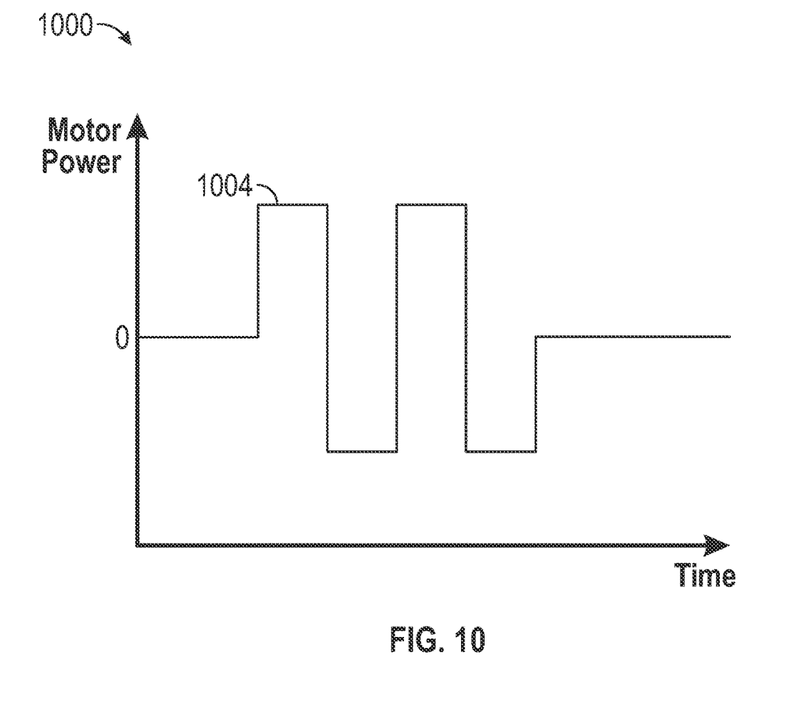
FIG. 10 is a motor power plot of a high frequency oscillation, in accordance with an embodiment of the disclosure.

FIG. 9 is a fan pitch plot 900 of an auto-throttle, in accordance with an embodiment, and FIG. 10 is a motor power plot 1000 of an auto-throttle, in accordance with an embodiment. In fan pitch plot 900, a variable pitch fan with electric motor response 904 is depicted. In motor power plot 1000, a variable pitch fan with electric motor response 1004 is depicted. Collectively, the fan pitch in the variable pitch fan with electric motor response 904 combines with the motor power depicted in the variable pitch fan with electric motor response 1004 to high frequency oscillation performance as illustrated, for example, in FIGS. 7-10.

Figure 11:
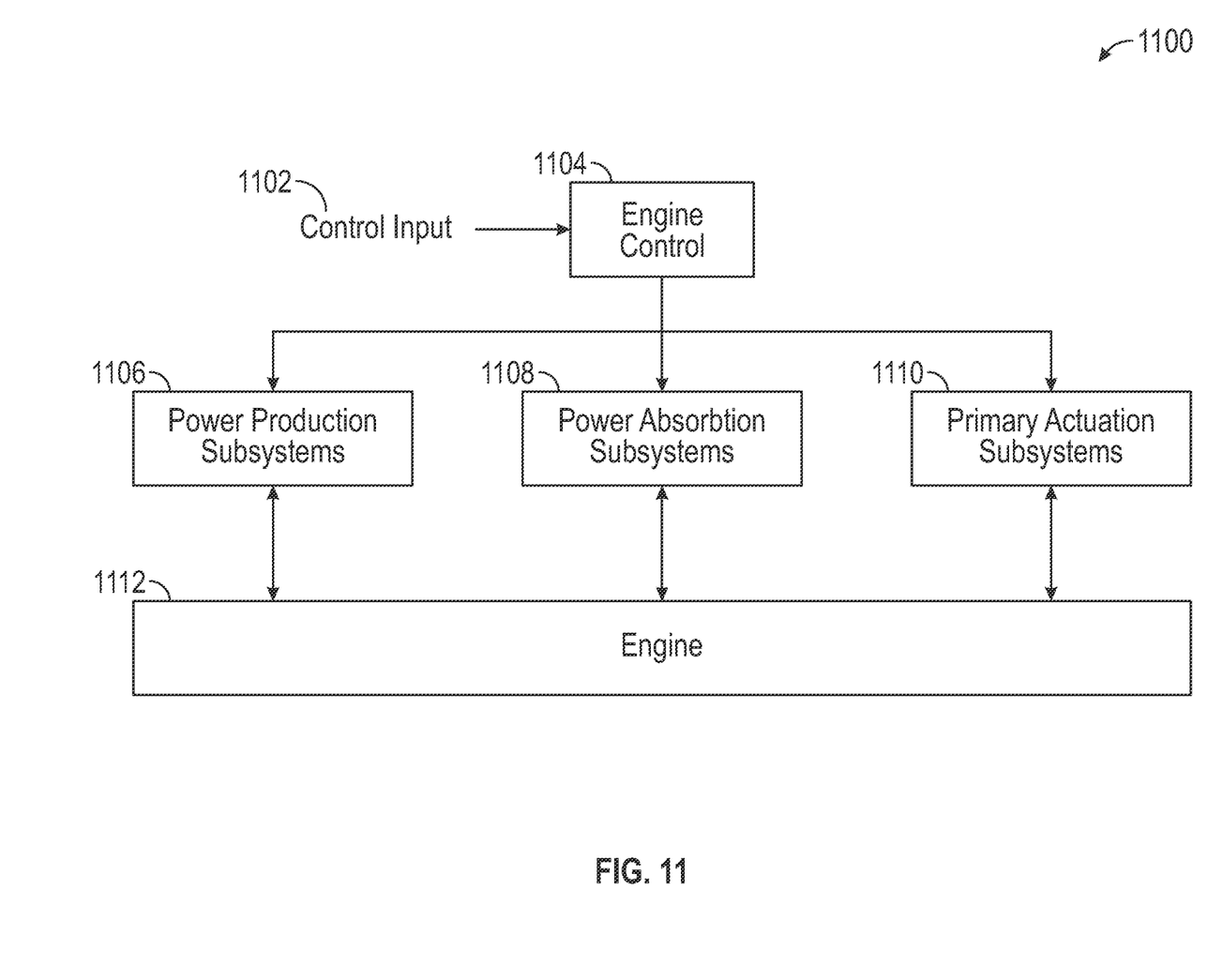
FIG. 11 is a block diagram of a propulsion system, in accordance with an embodiment of the disclosure.

Referring to FIG. 11, a block diagram of a propulsion system 1100 is depicted in accordance with an embodiment. In the example of FIG. 11, an engine control 1104, such as controller 216 of FIG. 2, receives a control input 1102. The control input 1102 can be, for instance, one or more of: a thrust command, a throttle lever angle, a clearance, a compressor parameter, and a turbine parameter. The control input 1102 may be a pilot input or otherwise received on an aircraft bus. The engine control 1104 may interface with multiple subsystems 1106, 1108, 1110 to control an engine 1112, such as the gas turbine engine 20 of FIG. 1. Power production subsystems 1106 can include either or both of the actuation system 205 and the electric component 212 of FIG. 2 when operating in a power production mode. Power absorption subsystems 1108 can include either or both of the actuation system 205 and the electric component 212 of FIG. 2 when operating in a power absorption mode. Primary actuation subsystems 1110 can include other non-cyclic actuation systems, such as fuel system control, compressor vane control, and the like. A control example for the engine control 1104 is depicted in FIG. 12.

Figure 12:
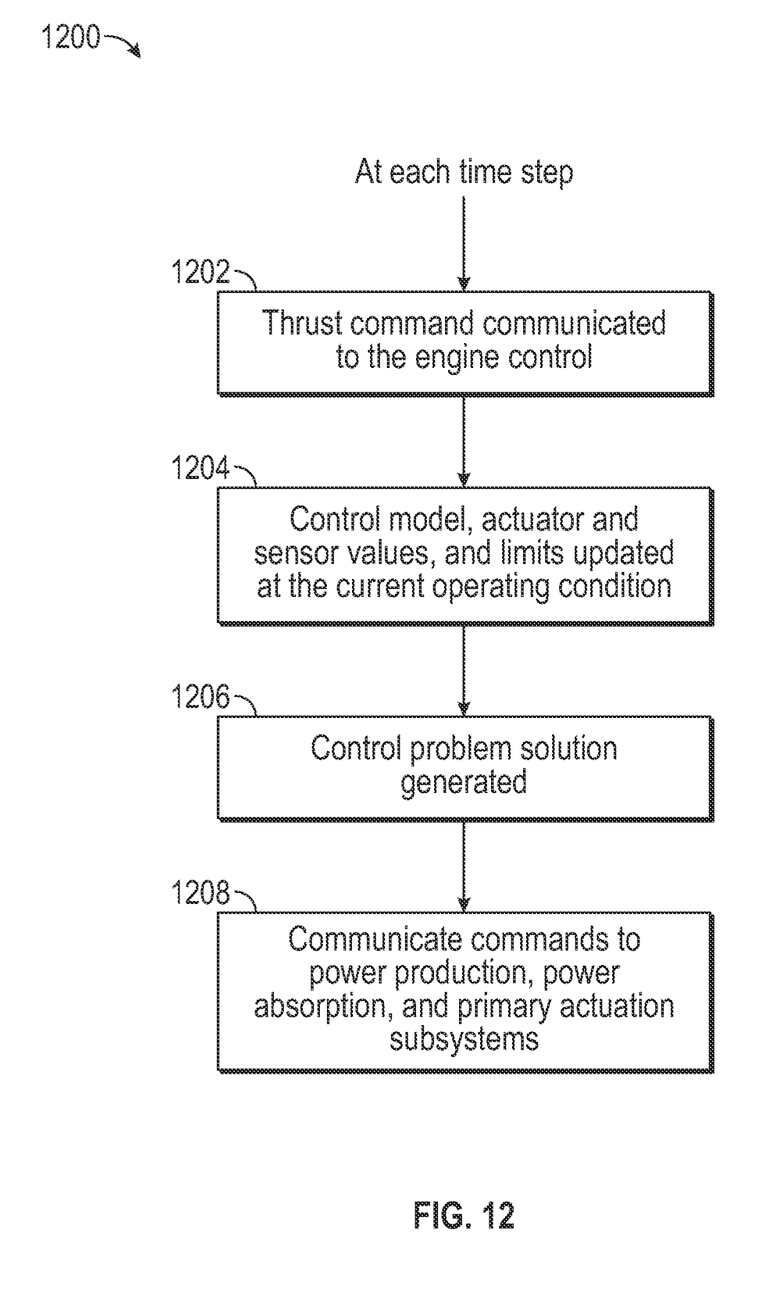
FIG. 12 is a flow chart illustrating a method, in accordance with an embodiment of the disclosure.

In FIG. 12, a method 1200 may be executed by the engine control 1104 of FIG. 11 at each control time step in a loop.

At block 1202, a control input 1102 of FIG. 11, such as a thrust command, can be communicated to and received at the engine control 1104.

At block 1204, the engine control 1104 can determine a plurality of current operating conditions of the engine 1112 of FIG. 11. Determining the plurality of current operating conditions of the engine 1112 can be performed using a control model and a plurality of actuator parameters, sensor values, and limits.

At block 1206, a control problem solution can be generated. Examples of control system implementations can include constrained model-based control, multivariable system control, adaptive control, constrained dynamic inversion control, and other such techniques known in the art. Models can be incorporated for the power production subsystems 1106, power absorption subsystems 1108, and/or primary actuation subsystems 1110 with associated limits and rate limits. For example, fan flow can depend on shaft speed and fan blade variable angle, which can be modeled based on an actuator time response. Torque can be added or subtracted by the electric component 212 of FIG. 2 from dynamical equations associated with spool dynamics, which can account for spool inertia. Models can be added for electrical power generation and may include battery system and/or auxiliary power unit effects. Rather than controlling to low shaft speed, control objectives can be shifted to other parameters, such as thrust, clearance, and/or other compressor or turbine parameters beyond speed control. Compensation effects can be added and diminished as balancing of power contributions or reductions shift between the power production subsystems 1106 and the power absorption subsystems 1108. Thus, the engine control 1104 can calculate a plurality of commands to a plurality of power production and absorption subsystems 1106, 1108 for adjusting a variable cycle based on the current operation condition of the gas turbine engine 20 using a plurality of models of the subsystems that describe relationships between the commands and respective impacts on engine power production and absorption.

At block 1208, the engine control 1104 can communicate commands to power production subsystems 1106, power absorption subsystems 1108, and/or primary actuation subsystems 1110.

Figure 13:
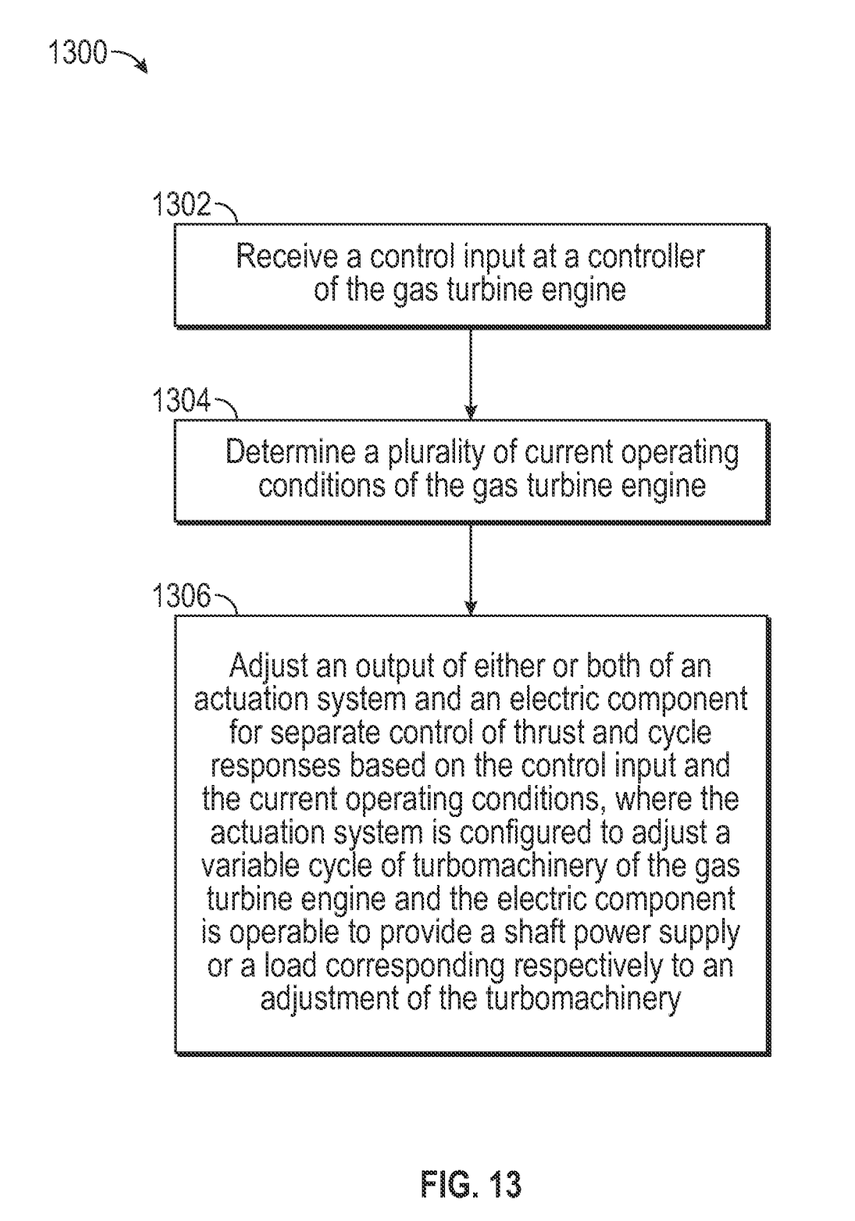
FIG. 13 is a flow chart illustrating a method, in accordance with an embodiment of the disclosure.

Referring now to FIG. 13 with continued reference to FIGS. 1-12, FIG. 13 is a flow chart illustrating a method 1300 of variable cycle compensation in a gas turbine engine, in accordance with an embodiment. The method 1300 may be performed, for example, by the variable cycle system 210 of FIG. 2 and propulsion system 1100 of FIG. 11. For purposes of explanation, the method 1300 is described primarily with respect to the variable cycle system 210 of FIG. 2 and the propulsion system 1100 of FIG. 11; however, it will be understood that the method 1300 can be performed on other configurations (not depicted).

At block 1302, a control input 1102 can be received at a controller 216 (e.g., engine control 1104) of a gas turbine engine 20 (e.g., engine 1112). At block 1304, the controller 216 can determine a plurality of current operating conditions of the gas turbine engine 20. At block 1306, the controller 216 can adjust an output of either or both of an actuation system 205 and an electric component 212 for separate control of thrust and cycle responses based on the control input 1102 and the current operating conditions. The actuation system 205 can be configured to adjust a variable cycle of turbomachinery 202 of the gas turbine engine 20 (e.g., as the power production subsystems 1106 or the power absorption subsystems 1108). The electric component 212 can be operable to provide a shaft power supply or a load corresponding respectively to an adjustment of the turbomachinery 202.

While the above description has described the flow process of FIG. 13 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of variable cycle compensation in a gas turbine engine, the method comprising:
    adjusting, by a controller during an acceleration or thrust oscillation event, an electric component to compensate for a power change induced by an actuation system by operating the electric component as an electric motor to compensate for an increase in power absorption or a decrease in power production of a turbomachinery of the gas turbine engine responsive to the acceleration or thrust oscillation event, wherein the turbomachinery comprises at least one compressor section and at least one turbine section operably coupled to a shaft of the gas turbine engine, the actuation system is configured to adjust a variable cycle of the turbomachinery by adjusting power absorption or power production, and the electric component is configured to add or subtract torque to the shaft; and
    operating the electric component as an electric generator to compensate for an increase in power production or a decrease in power absorption of the turbomachinery, wherein compensation provided by operating the electric component provides a power adjustment until a spool speed driven by the at least one turbine section of the gas turbine engine changes to catch up with the power change induced by the actuation system, wherein the electric component is operable to respond with a faster rate of change than the actuation system.

2. The method of claim 1, further comprising:
    receiving a control input; and
    determining a plurality of current operating conditions of the gas turbine engine.

3. The method of claim 2, further comprising:
    calculating a plurality of commands to a plurality of power production and absorption subsystems for adjusting the variable cycle based on the current operating conditions of the gas turbine engine using a plurality of models of the subsystems that describe relationships between the commands and respective impacts on engine power production and absorption.

4. The method of claim 3, further comprising:
    communicating the commands to the power production and absorption subsystems, and one or more other actuation subsystem based on the control input and the current operating conditions.

5. The method of claim 4, wherein the electric component absorbs power as the electric generator to produce electrical power for an aircraft use or recharging of a battery system.

6. The method of claim 4, wherein the actuation system comprises a variable area turbine.

7. The method of claim 1, wherein the electric component is a motor-generator.

8. The method of claim 1, wherein the electric component adds power as the electric motor.

9. The method of claim 1, wherein the actuation system comprises one or more of a variable area nozzle and/or a variable fan blade angle.

10. The method of claim 1, wherein the actuation system comprises one or more of an adaptive fan system and/or a rotating fan inlet guide vane.

\* \* \* \* \*